United States Patent
Garceau et al.

(10) Patent No.: US 7,328,541 B2
(45) Date of Patent: Feb. 12, 2008

(54) APPARATUS AND METHOD FOR CONTROLLING POSITION OF AN EDGE OF AN ADVANCING WEB OF FLEXIBLE MATERIAL

(75) Inventors: Mark Garceau, Bethlehem, CT (US); John Corrigan, Washington, CT (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 0 days.

(21) Appl. No.: 11/414,921

(22) Filed: May 1, 2006

(65) Prior Publication Data
US 2007/0251631 A1    Nov. 1, 2007

(51) Int. Cl.
B65B 31/04    (2006.01)
B65H 23/04    (2006.01)

(52) U.S. Cl. .......................... 53/79; 53/96; 226/196.1; 242/615.4

(58) Field of Classification Search ............. 242/615.4, 242/615.12, 615.21; 226/15, 16, 24, 174, 226/175, 190, 194, 196.1; 53/79, 88, 89, 53/95, 96, 403
See application file for complete search history.

(56) References Cited

U.S. PATENT DOCUMENTS

| | | | | |
|---|---|---|---|---|
| 2,084,367 A | * | 6/1937 | Woodhead | .................. 26/18.6 |
| 2,593,158 A | | 4/1952 | Lorig | |
| 4,035,878 A | * | 7/1977 | Cheatham | ................. 242/615.4 |
| 4,300,714 A | * | 11/1981 | Dahl et al. | ............. 242/615.12 |
| 4,335,857 A | * | 6/1982 | Pfost et al. | .................. 226/190 |
| 5,226,577 A | * | 7/1993 | Kohler | ................... 242/615.21 |
| 5,335,483 A | | 8/1994 | Gavronsky et al. | |
| 5,522,785 A | * | 6/1996 | Kedl et al. | .................... 226/174 |
| 6,116,159 A | * | 9/2000 | Koyama | ...................... 226/190 |
| 6,295,181 B1 | * | 9/2001 | Fahimi et al. | ............ 226/196.1 |
| 6,984,412 B2 | | 1/2006 | Tanaka | |
| 7,165,375 B2 | * | 1/2007 | O'Dowd | ......................... 53/96 |
| 2006/0289108 A1 | * | 12/2006 | McNamara et al. | ......... 156/147 |

FOREIGN PATENT DOCUMENTS

| | | |
|---|---|---|
| EP | 0 562 228 | 9/1993 |
| GB | 2 030 968 | 4/1980 |
| JP | 9-315633 | 9/1997 |
| JP | WO 02/092293 | 11/2002 |

OTHER PUBLICATIONS

International Search Report for corresponding International Application No. PCT/US2007/067902.
Written Opinion of the International Searching Authority for corresponding International Application No. PCT/US2007/067902.

* cited by examiner

Primary Examiner—Louis Huynh
(74) Attorney, Agent, or Firm—Alston & Bird LLP

(57) ABSTRACT

A method comprises pulling a continuous web to advance the web along a path of conveyance and to create tension in a lengthwise portion of the web; manipulating the web to cause the portion of the web at a point along the path to have a non-uniform tension across the width of the web, with a maximum tension being at a location spaced from the first longitudinal edge of the web, and with the tension decreasing from such location toward the first longitudinal edge of the web such that a zone in the web at the first longitudinal edge has reduced tension; and controlling transverse positioning of the first longitudinal edge in the zone of reduced tension. The reduced-tension zone is produced by a tension-reducing member about which the web is pulled.

11 Claims, 4 Drawing Sheets

Figure 1:
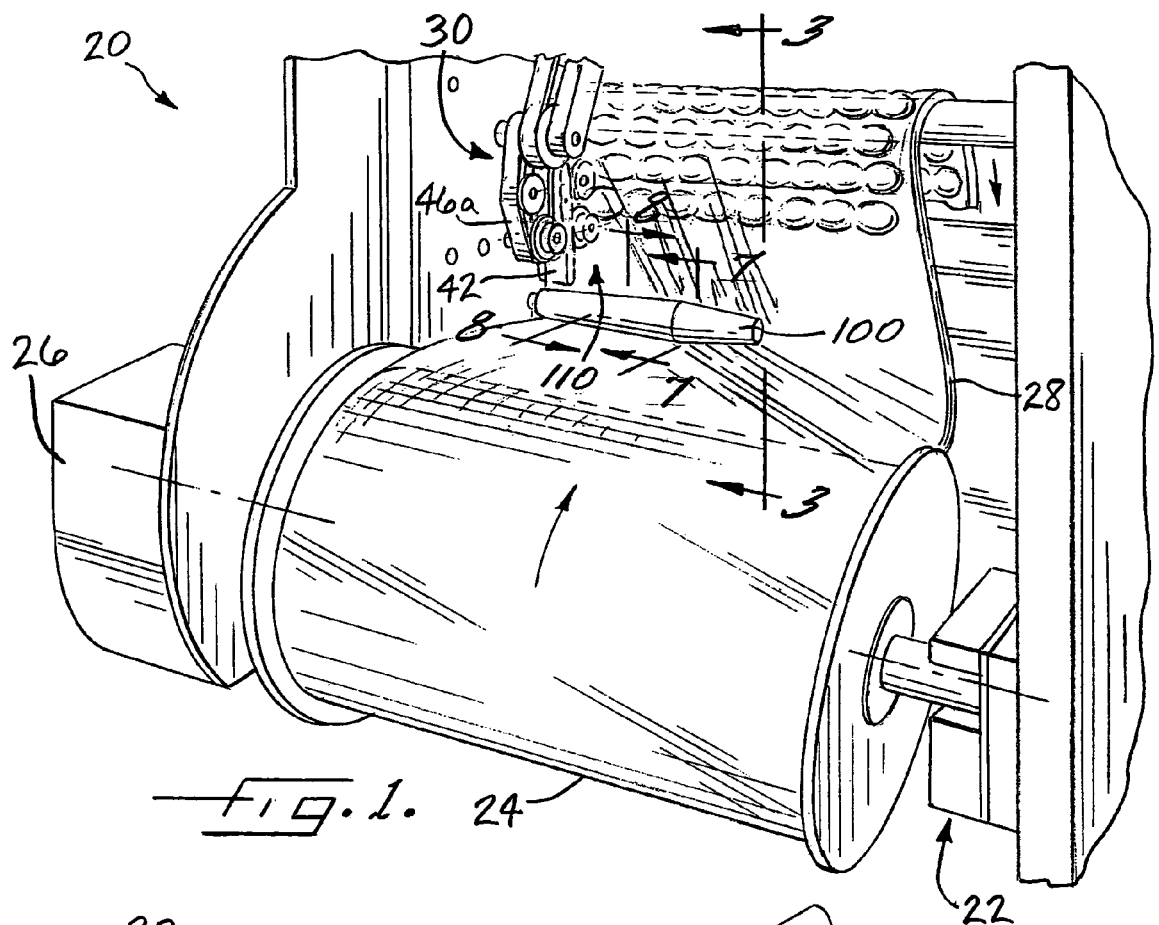

APPARATUS AND METHOD FOR CONTROLLING POSITION OF AN EDGE OF AN ADVANCING WEB OF FLEXIBLE MATERIAL

BACKGROUND OF THE INVENTION

The present invention relates generally to apparatus and methods for controlling and guiding a continuous web of flexible material (e.g., plastic film, fabric, paper, etc.) as the web is advanced along a path of conveyance, and relates more particularly to apparatus and methods for controlling the positioning of an edge of an advancing web relative to a device performing an operation along the edge. In particular embodiments, the invention relates to apparatus and methods for controlling and guiding an inflatable web.

In the processing of continuous webs of material, there is often a need to perform an operation on the web along one longitudinal edge of the web, wherein the positioning of the edge relative to the device performing the operation can be important or even critical to the quality and/or the success of the operation. For example, it may be desirable to form a feature (e.g., a seal, a line of stitching, a perforation, etc.) in the web along the edge, and to accurately control the position of such feature relative to the edge. In such contexts, it is desirable to accurately control the transverse positioning of the edge of the web relative to the device.

In the particular application of manufacture of gas-inflated products such as cushions for packaging or the like, in some cases the cushions are formed from a web having two plies of plastic film that are sealed together in a pattern defining inflatable chambers that are in communication with a channel or opening along one longitudinal edge of the web. The web is advanced from its supply roll to an inflation device that has a portion extending between the two plies along the longitudinal edge for inflating the chambers. The plies are then sealed together using a sealing device so as to seal the chambers closed. The transverse positioning of the edge of the web relative to the inflation and sealing devices can be important to the quality and/or success of the inflation and sealing operations.

Various approaches have been employed for controlling the edge position of such an inflatable web. As one example, U.S. patent application Ser. No. 11/181,136 filed on Jul. 14, 2005, the entire disclosure of which is incorporated herein by reference, describes an edge position control system that includes a tracking sensor used to detect the transverse position of the web with respect to the inflation device. A web tracking system is employed to continually adjust the transverse position of the web to maintain it within a predetermined range with respect to the inflation device. In this manner, the consistency of inflation of the inflatable chambers is improved.

The present invention, in particular embodiments directed to inflatable webs, represents a further development of edge position control apparatus and methods for web inflation machines, and furthermore is more generally applicable to other types of web-handling systems and methods wherein it is desired to control the edge positioning of a web.

BRIEF SUMMARY OF THE INVENTION

The present invention in one aspect provides a web guide system for moving and guiding a continuous web along a path of conveyance, the web having a width defined along a transverse direction between opposite first and second longitudinal edges of the web, the web guide system comprising:

a web drive system structured and arranged to pull the web and advance the web along the path of conveyance;

a tension-reducing device located upstream of the web drive system and positioned to contact one surface of the web and to cause the web to partially wrap about an outer surface of the tension-reducing device, the tension-reducing device being configured to focus tension produced in the web by the web drive system upon the tension-reducing device at a location spaced in the transverse direction from the first longitudinal edge of the web;

the web drive system being operable to pull the web around the tension-reducing device such that a tension in the web is non-uniform across the width of the web and reaches a maximum tension generally at the location of maximum arc distance and decreases toward the first longitudinal edge of the web to create a zone in the web at the first longitudinal edge having a lower degree of tension relative to the tension in the web at said location; and a web edge guide positioned to engage the web in said zone and to control transverse positioning of the first longitudinal edge.

In accordance with one embodiment, the tension-reducing device comprises an elongate member extending generally transversely from the first longitudinal edge of the web toward the second longitudinal edge, the elongate member being structured and arranged to cause the web to partially wrap about the outer surface of the elongate member for an angle $\theta$, the outer surface defining a maximum arc distance over the angle $\theta$ at said location, and the outer surface being configured such that everywhere between the first longitudinal edge of the web and said location an arc distance over the angle $\theta$ is smaller than the maximum arc distance.

The web edge guide can be a stationary element that passively dictates the positioning of the first longitudinal edge of the web. The reduced-tension zone in the first longitudinal edge of the web allows the web edge guide to freely act on the web so as to control the transverse positioning of the edge. The system in accordance with the invention thus is simple in construction and operation, and its reliability is not dependent upon proper functioning of sensors or web tracking systems.

In accordance with one embodiment of the invention, the tension-reducing device comprises an elongate member extending generally transversely from the first longitudinal edge of the web toward the second longitudinal edge, the elongate member defining the outer surface that engages the web. The elongate member includes a first tapered portion that increases in arc distance along the outer surface over the angle $\theta$ from the first longitudinal edge to the location of maximum arc distance. The elongate member can further include a second tapered portion that decreases in arc distance along the outer surface over the angle $\theta$ from the location of maximum arc distance toward the second longitudinal edge of the web, such that the outer surface of the elongate member over the angle $\theta$ is generally crown-shaped. In one embodiment, the length of the elongate member is less than the width of the web.

The elongate member in accordance with one embodiment is non-rotating—i.e., the member does not rotate about its axis. Alternatively, however, the member can comprise a roller that rotates about its axis.

In accordance with another embodiment of the invention, the system further comprises a roll of the web rotatably mounted in a mounting arrangement, wherein the web comprises two overlying plies defining an opening between the plies along the first longitudinal edge. For example, the web can comprise an inflatable web in which the two plies are sealed together in a pattern defining inflatable chambers that are open to the opening along the first longitudinal edge. The web edge guide can comprise part of an inflation device having a portion that extends between the plies to inflate the chambers with a gas.

The system can further comprise a sealing device for sealing the two plies together along the first longitudinal edge after inflation of the chambers so as to seal the chambers closed. The sealing device advantageously is located downstream of the end of the reduced-tension zone, where tension has resumed in the first longitudinal edge of the web.

In another aspect of the invention, a method is provided for moving and guiding a continuous web along a path of conveyance, comprising the steps of:
  pulling the web to advance the web along the path of conveyance and to create tension in a lengthwise portion of the web;
  manipulating the advancing web to cause said portion of the web at a predetermined point along the path of conveyance to have a non-uniform tension across the width of the web, with a maximum tension being at a location spaced from the first longitudinal edge of the web, and with the tension decreasing from said location toward the first longitudinal edge of the web such that a zone in the web at the first longitudinal edge has a lower degree of tension relative to the tension in the web at said location; and
  controlling transverse positioning of the first longitudinal edge in the zone of reduced tension.

The step of manipulating the web to create the zone of reduced tension can be performed by causing the web to partially wrap about an outer surface of a tension-reducing device for an angle θ, the tension-reducing device defining a maximum arc distance over the angle θ at the location spaced from the first longitudinal edge of the web, and the outer surface being configured such that everywhere between the first longitudinal edge and said location an arc distance over the angle θ is smaller than the maximum arc distance.

In one embodiment, the web comprises an inflatable web having two overlying plies defining an opening between the plies along the first longitudinal edge, the plies being sealed together in a pattern defining inflatable chambers that are open to the opening along the first longitudinal edge. A portion of an inflation device is positioned between the plies in the zone of reduced tension for inflating the chambers, the inflation device engaging the first longitudinal edge of the web and controlling the transverse positioning thereof. The method further comprises sealing the two plies together along the first longitudinal edge after inflation of the chambers so as to seal the chambers closed. The sealing preferably takes place downstream of the reduced-tension zone, where tension in the web has been restored.

BRIEF DESCRIPTION OF THE SEVERAL VIEWS OF THE DRAWING(S)

Figure 2:
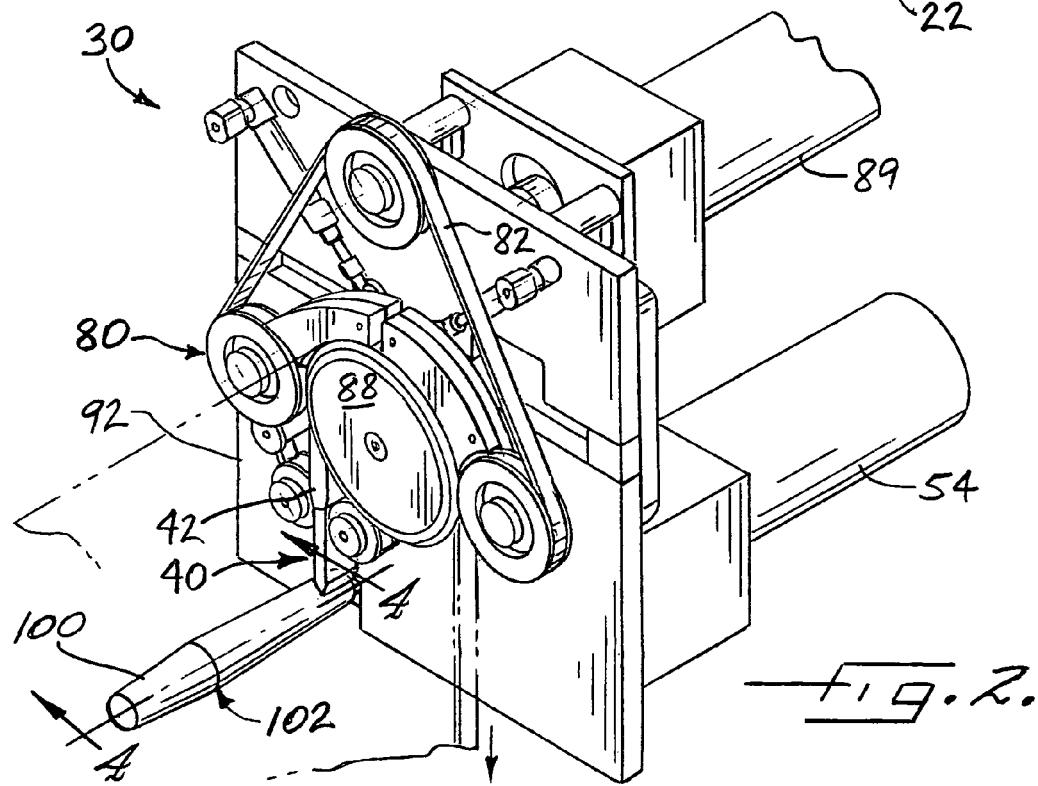
Figure 3:
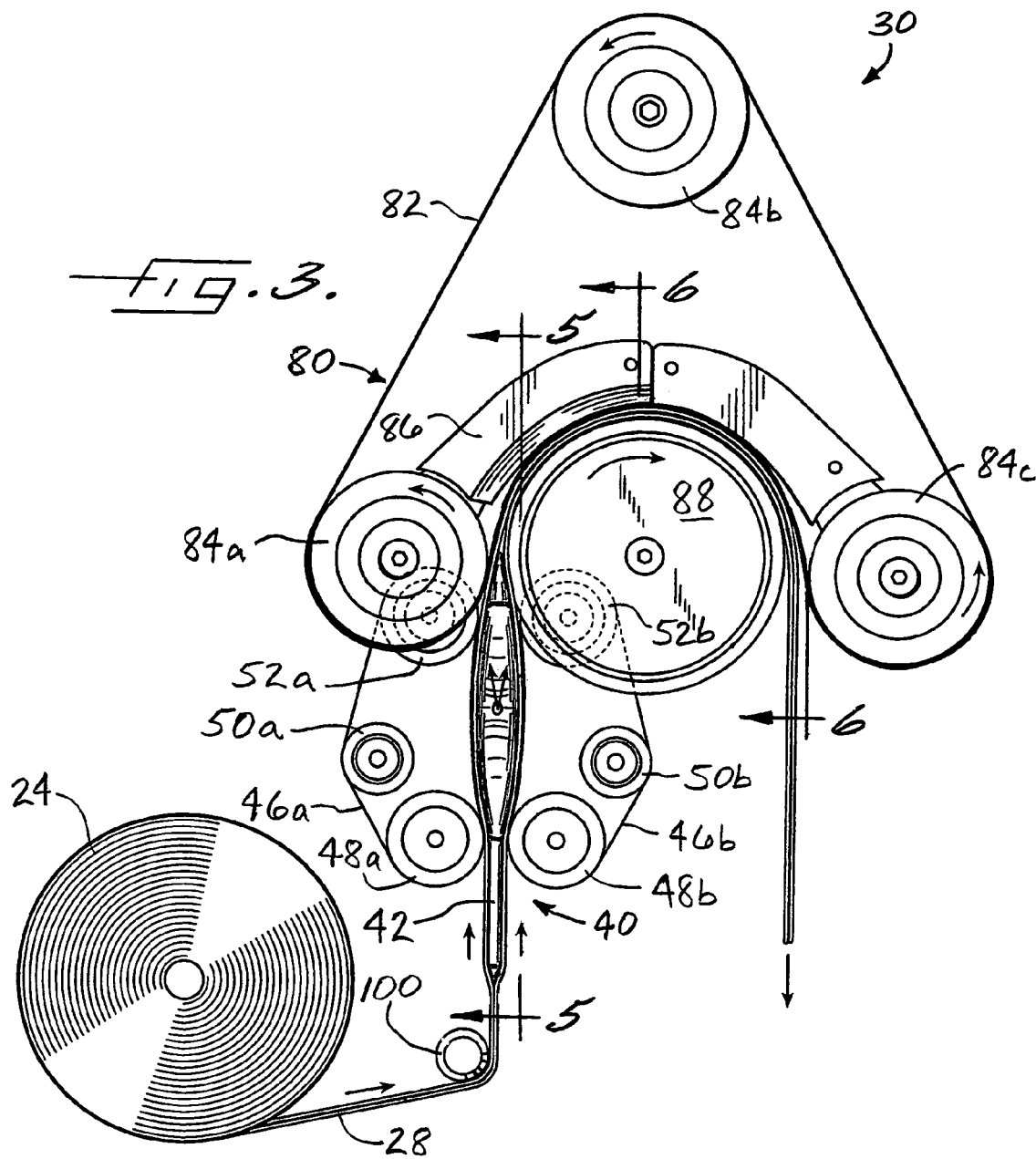
Figure 4:
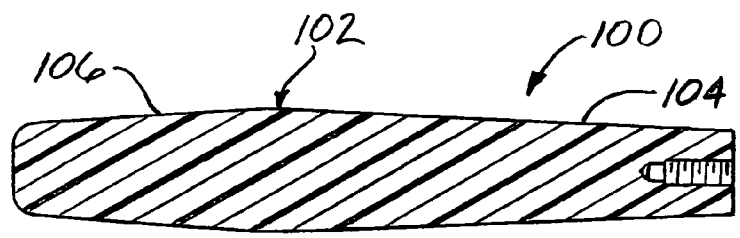
Figure 5:
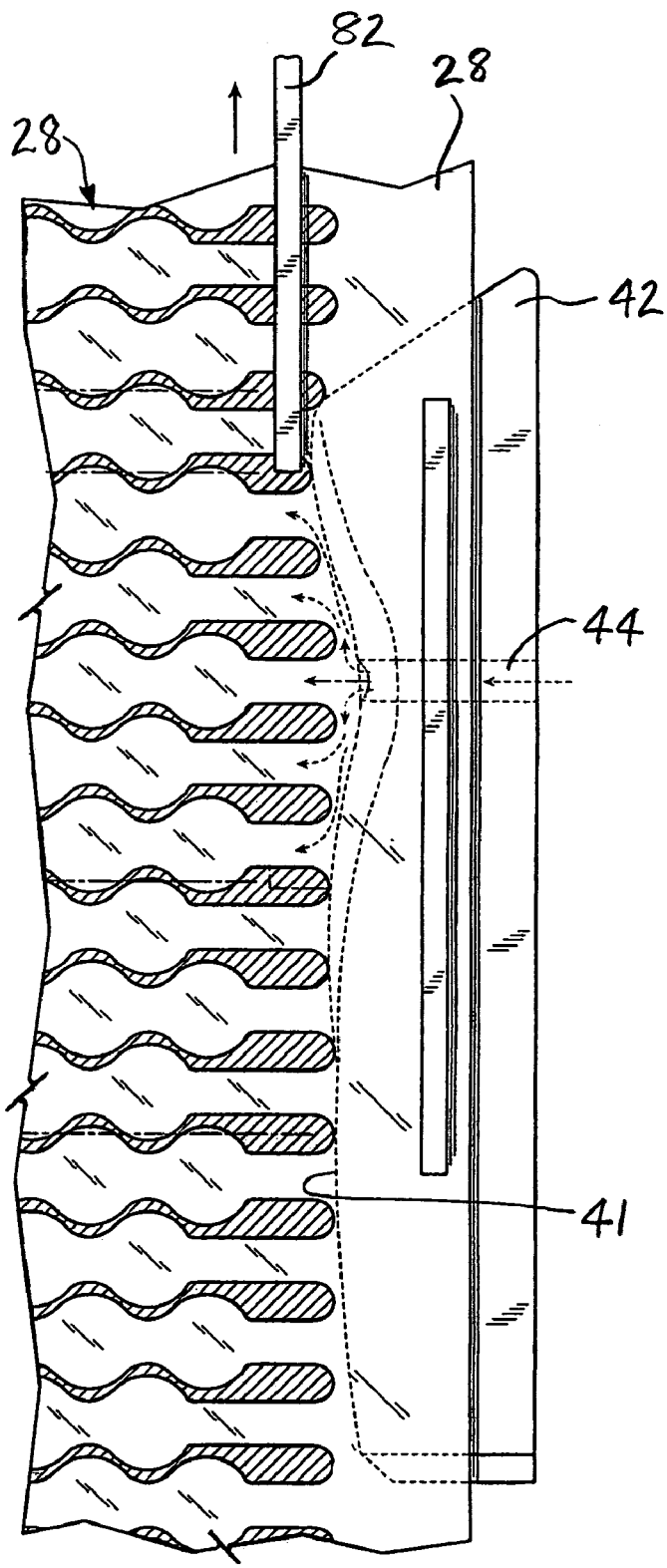
Figure 6:
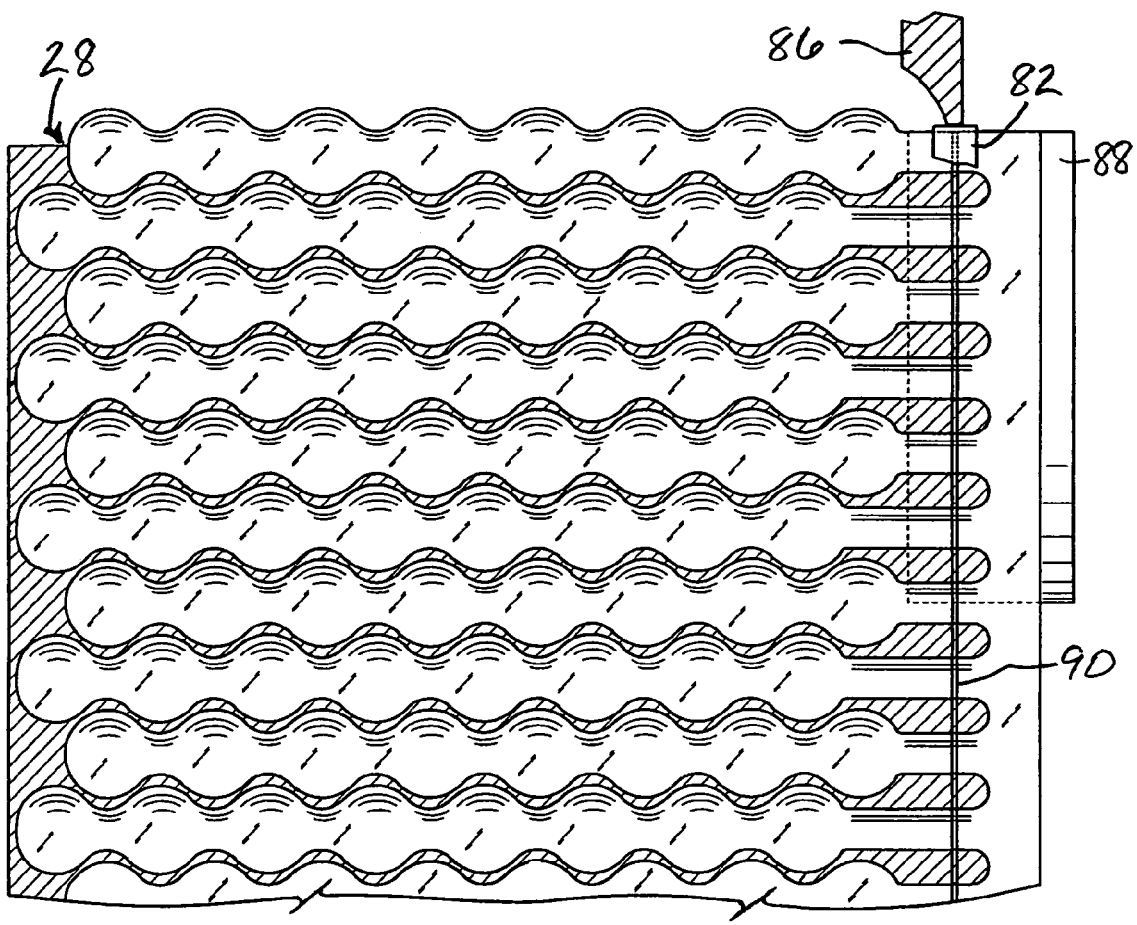
Figure 7:
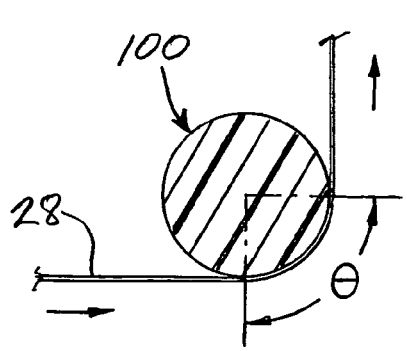
Figure 8:
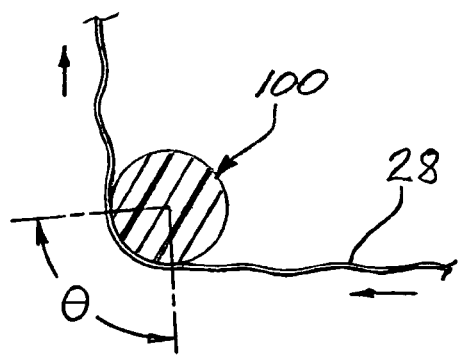

Having thus described the invention in general terms, reference will now be made to the accompanying drawings, which are not necessarily drawn to scale, and wherein:

FIG. 1 is a perspective view of an apparatus in accordance with one embodiment of the invention;
FIG. 2 is a perspective view of a portion of the apparatus;
FIG. 3 is a view along line 3-3 in FIG. 1;
FIG. 4 is a cross-sectional view along line 4-4 in FIG. 2;
FIG. 5 is a cross-sectional view along line 5-5 in FIG. 3, showing an inflatable web after being inflated and as the web is being sealed;
FIG. 6 is a cross-sectional view along line 6-6 in FIG. 3;
FIG. 7 is a cross-sectional view along line 7-7 in FIG. 1, through the maximum-diameter part of the tension-reducing device; and
FIG. 8 is a cross-sectional view along line 8-8 in FIG. 1, through the tension-reducing device at the longitudinal edge of the web.

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

An apparatus 20 for processing a continuous web in accordance with one embodiment of the invention is illustrated in FIGS. 1 through 8. The apparatus in particular is designed for inflating a continuous inflatable web as the web is advanced along a path of conveyance. However, the invention is applicable to a wide variety of devices for processing a continuous web of flexible material wherein a process must be performed along an edge of the advancing web, and wherein the transverse positioning of the edge of the web must be precisely controlled relative to a device performing the process. Thus, the specific context of an inflatable web is presented herein solely for purposes of illustrating one practical application of the invention, and is not to be construed as limiting in any way. The apparatus 20 includes a roll-mounting arrangement 22 for mounting a roll 24 of continuous inflatable web such that the roll is rotatable about its axis. The roll-mounting arrangement in one embodiment includes a tension-regulating mechanism 26, such as an electromechanical brake or the like, for regulating the tension of the web 28 as it is withdrawn from the roll.

The apparatus 20 further comprises a web-processing apparatus 30 that is structured and arranged for advancing the web along a path of conveyance and performing one or more operations on an edge of the advancing web. The web-processing apparatus in the illustrative embodiment is designed to drive the inflatable web 28 along a path and to inject air into chambers defined in the web and then to seal the chambers closed along one edge of the web. The web 28 can comprise a C-fold web, one longitudinal edge of which is a fold line about which the film material is folded to position one half-width portion of the film (i.e., one ply) in overlying relation with the other half-width portion of the film (i.e., another ply). Alternatively, the web 28 can comprise a two-ply web formed of two separate film plies overlain. Hereinafter, the term "two-ply web" is used generically to refer to both types of webs. The two plies of the web are sealed together in a pattern defining a plurality of chambers that are spaced apart along the length of the web and are open at one end adjacent one edge of the web such that air can be injected through the open ends of the chambers to inflate the chambers. Along the longitudinal edge of the two-ply web adjacent the open ends of the chambers, the two plies are not joined together and thus define an opening connected with the open ends of the chambers such that an inflation device can be inserted between the plies to inflate the chambers. The structure of the inflatable web 28 is further described below in connection with FIGS. 5 and 6.

Details of the web-processing apparatus 30 in accordance with one embodiment of the invention are now described in connection with FIGS. 2 through 8. The apparatus includes an inflation and drive device 40 and a sealing device 80. The inflation and drive device comprises an inflation member 42 configured to be received between the two plies of the web along its open edge. The inflation member has a generally vane-shaped configuration. As shown in FIG. 5, the inflation member has an air passage 44 extending through it for supplying air into the chambers of the inflatable web. One ply of the web passes along one surface of the inflation member, and the other ply passes along an opposite surface of the inflation member, as best seen in FIG. 3. The inflation and drive device 40 further comprises a pair of endless belts 46a, 46b. The belt 46a is looped about a series of rollers 48a, 50a, 52a arranged with respect to the inflation member 44 such that the belt 46a exerts pressure on one ply of the web against one surface of the inflation member. Similarly, the other belt 46b is looped about a series of rollers 48b, 50b, 52b arranged with respect to the inflation member 44 such that the belt 46b exerts pressure on the other ply of the web against the other surface of the inflation member. One or more of the rollers 48a, 50a, 52a and one or more of the rollers 48b, 50b, 52b can be rotatably driven such that the belts 46a, 46b are driven and thus serve to advance the web along a path of conveyance. For example, with reference to FIG. 2, a motor 54 can be provided for rotatably driving the rollers 48a, 48b to drive the belts 46a, 46b.

The sealing device 80 includes an endless belt 82 of heat-conducting material looped about a series of rollers 84a, 84b, 84c, a heater 86 arranged for heating the belt 82, and a seal wheel 88 arranged to form a nip region with the heater 86 through which the open edge of the web 28 passes along with the belt 82, such that one surface of the web is against an outer surface of the seal wheel 88 and the belt 82 is against the opposite surface of the web. The seal wheel 88 can be rotatably driven by a motor 89 (FIG. 2), which drives the web and also causes the heated belt 82 to be driven about its guide rollers through frictional engagement of the belt with the web. Alternatively, the seal wheel 88 can be driven off the same motor 54 used for driving the belts 46a, 46b.

After the inflation member 42 has inflated the chambers in the web, the heated belt 82 seals the two plies of the web together along a longitudinal seal 90 (FIG. 6) to seal the chambers closed.

The proper operation of the inflation and drive device 40 and the sealing device 80 depends on maintaining the transverse position of the open edge of the two-ply web within a certain tolerance relative to these devices. Accordingly, the apparatus 20 can include a web edge guide designed to dictate the transverse positioning of the edge of the web. In the illustrated embodiment, the inflation member 42 serves as the web edge guide. More particularly, with reference to FIG. 5, the seals between the two plies of the web 28 defining the inflatable chambers have ends that are aligned along a longitudinal axis spaced from the adjacent longitudinal edge of the web. The proper position of the web in the transverse position is attained when the ends of these seals are sliding along the free outboard edge 41 of the inflation member 42. The apparatus also includes a plate 92 (FIG. 2) that defines a surface adjacent to which the edge of the web runs when the web is in the proper position. The inflation member 42 projects between the plies of the web at a generally perpendicular angle relative to the surface of the plate 92.

The apparatus 20 as described thus far generally corresponds to the apparatus described in co-pending U.S. patent application Ser. No. 11/051,204, filed Feb. 5, 2005, entitled "Inflation Device for Forming Inflated Containers", the entire disclosure of which is incorporated herein by reference.

In the course of further development of the apparatus, it has been found that tension in the web along its open edge can interfere with the proper operation of the web edge guide. Stated simply, when the web is under tension it is difficult for the inflation member 42 to freely dictate the transverse position of the web edge, and hence it is difficult to maintain the web edge in the proper location relative to the inflation device and sealing device.

In accordance with the invention, a tension-reducing device 100 is provided for creating a zone of reduced tension along the open edge of the web. The web edge guide is located in this zone, and therefore is able to freely dictate the position of the web edge because the tension in the edge is reduced. In preferred embodiments of the invention, the tension-reducing device operates to create substantially zero tension in the zone. The structure and operation of the tension-reducing device 100 are now described with primary reference to FIGS. 1, 3, 4, 7, and 8. The tension-reducing device comprises an elongate member that extends transversely across the web 28 and about which the web is pulled under tension by the web drive system previously described, such that the web partially wraps about the circumference of the tension-reducing device and is changed in its direction of travel. The outer surface of the tension-reducing device is shaped to produce the reduced-tension zone along the open edge of the two-ply web 28.

More particularly, the tension-reducing device 100 is located upstream of the web drive system and is positioned to contact one surface of the web and to cause the web to partially wrap about an outer surface of the tension-reducing device for an angle θ as shown in FIGS. 7 and 8. The outer surface of the tension-reducing device defines a maximum arc distance over the angle θ at a location spaced from the open edge of the web in a direction generally toward the other longitudinal edge, as best seen in FIG. 1. The outer surface of the tension-reducing device is configured such that everywhere between the open edge of the web and the location of maximum arc distance, an arc distance over the angle θ is smaller than the maximum arc distance. This is most clearly seen by comparing FIGS. 7 and 8. FIG. 7 shows a cross-sectional view through a portion 102 of the tension-reducing device 100 where the arc distance over the web wrap angle θ is a maximum. FIG. 8 shows a cross-sectional view through the device at a point closer to the open edge of the web. The arc distance over the web wrap angle θ in FIG. 8 is smaller than the arc distance in FIG. 7. Because of such shaping of the tension-reducing device 100, the web at the location of the maximum arc distance is under tension, but the tension decreases from that point toward the open edge of the web, and a zone 110 (FIG. 1) of reduced tension is created along the open edge of the web for some distance. Preferably, the tension in the zone 110 is substantially zero. FIG. 8 illustrates the slack in the web in this zone. Downstream of the tension-reducing device 100, the zone 110 of reduced tension has a generally triangular shape as illustrated in FIG. 1, bounded by a line that extends obliquely from the location of maximum arc distance about the device 100 to the open edge of the web. Advantageously, the web edge guide (i.e., the inflation member 42) is located in the reduced-tension zone. The device 100 tends to position the web toward the plate 92 such that the free outboard edge 41 of the inflation device 42 tends to be contacted by the ends of the seals defining the chambers of the inflatable web, as seen in FIG. 5. The inflation member 42 is free to dictate the transverse positioning of the open edge of the web in the zone 110 because the tension in the web is reduced, and preferably is substantially zero.

The tension-reducing device 100 can have various configurations. In the illustrated embodiment as best seen in FIG. 4, the device has a generally crown-shaped configuration formed by a first tapered portion 104 that increases in arc distance along the outer surface over the web wrap angle θ from the one end of the device toward the portion 102 of maximum arc distance, and a second tapered portion 106 that decreases in arc distance along the outer surface over the angle θ from the maximum arc portion 102 toward the opposite end of the device. The portions 104, 106 can have circular cross-sectional shapes, such that each portion is frustoconical in configuration. In one embodiment, the cone half-angle of the frustoconical portion 104 can be about 4 degrees, and the half-angle of the portion 106 can be about 2.5 degrees. Alternatively, the device 100 can have a non-circular cross-sectional shape, as long as the portion of the device contacted by the web over the wrap angle θ has the characteristics described above. The shape of the part of the device's circumference not contacted by the web is of no importance to the functioning of the device to create the reduced-tension zone. Any device can be used that functions to manipulate the advancing web to cause the web to have a non-uniform tension across the width of the web, with a maximum tension being at a location spaced from one edge of the web in a direction generally toward the opposite edge, and with the tension decreasing from said location toward the one edge of the web such that a zone in the web at the one edge has reduced tension. In the illustrated embodiment, the part of the web traveling over the largest-diameter portion 102 of the tension-reducing device 100 must travel at a faster linear speed than the other parts of the web that travel over smaller-diameter portions of the tension-reducing device 100. The speed difference contributes to the creation of the reduced-tension zone 110 when the web is moving. Additionally, even when the web is static, the shape of the device 100 contributes toward the creation of the reduced-tension zone.

The tension-reducing device 100 in the illustrated embodiment has a length less than the width of the web 28, as best seen in FIG. 1. The device has a fixed end adjacent the open edge of the web, and the opposite end is free. Alternatively, the device could be as wide or wider than the web, and could have both ends fixed. The device 100 is stationary, i.e., it does not rotate about its axis. However, alternatively, a tension-control device that rotates could be employed.

As noted, the reduced-tension zone 110 has a generally triangular shape. Downstream of the oblique boundary of the zone that extends from the maximum arc portion 102 of the device 100 to the open edge of the web, there is tension in the web. The sealing device 80 advantageously is positioned downstream of the reduced-tension zone 110 such that a higher tension exists in the area of the web wherein the two plies are being sealed together, relative to the tension in the zone 110. The maintenance of tension during sealing is beneficial for eliminating or minimizing wrinkles in the web that could result in intermittent and inferior seals. Thus, in accordance with the invention when applied to the apparatus 20 for inflating an inflatable web, the open edge of the web is first positioned properly in the reduced-tension zone 110, and then downstream of the reduced-tension zone the web is sealed in a region where a higher degree of tension has been restored along the edge at which sealing takes place.

In an alternative embodiment of the invention, more than one reduced-tension zone can be created across the width of the web by suitably configuring a tension-reducing device with multiple transversely spaced sections having the type of configuration previously described for the tension-reducing device 100.

The tension-reducing device 100 functions essentially by focusing the web tension produced by the web drive system upon a discrete location spaced from one edge of the web. In the illustrated embodiment, the tension is focused on the maximum-diameter portion 102 of the device. The outer surface of the device is configured such that the rest of the device does not interfere with such focusing of the tension on the portion 102. As a result, a reduced-tension zone is created as previously described. It will be recognized that a similar result can be produced with a tension-reducing device that is positioned to contact the web at the location where it is desired to focus the tension, but that does not extend all the way to either of the longitudinal edges of the web. Various other configurations can be used for the tension-reducing device, as previously noted.

Many modifications and other embodiments of the inventions set forth herein will come to mind to one skilled in the art to which these inventions pertain having the benefit of the teachings presented in the foregoing descriptions and the associated drawings. For example, while the invention has been explained and illustrated as being applicable to a system for inflating a two-ply inflatable web, other types of webs and other types of processing devices can also take advantage of the invention. For instance, there may be instances in which a reduced-tension zone may be desirable in the processing (e.g., slitting, sealing, perforating, turning, etc.) of lay-flat tubular film. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A web guide system for moving and guiding a continuous web along a path of conveyance, the web having a width defined along a transverse direction between opposite first and second longitudinal edges of the web, the web guide system comprising:

a roll of the web rotatable mounted in a mounting arrangement, wherein the web comprises two overlying plies defining an opening between the plies along the first longitudinal edge, wherein the web comprises an inflatable web in which the two plies are sealed together in a pattern defining inflatable chambers that are open to the opening along the first longitudinal edge;

a web drive system structured and arranged to pull the web and advance the web along the path of conveyance;

a tension-reducing device located upstream of the web drive system and positioned to contact a surface of the web and to cause the web to partially wrap about an outer surface of the tension-reducing device, the tension-reducing device being configured to focus tension produced in the web by the web drive system upon the tension-reducing device at a location spaced in the transverse direction from the first longitudinal edge of the web;

the web drive system being operable to pull the web around the tension-reducing device such that tension in the web is non-uniform across the width of the web and reaches a maximum tension generally at said location and decreases toward the first longitudinal edge of the web to create a zone in the web at the first longitudinal edge having a lower degree of tension relative to the tension in the web at said location; and a web edge guide positioned to engage the web in said zone and to control transverse positioning of the first longitudinal edge, wherein the web edge guide comprises part of an inflation device having a portion that extends between the plies to inflate the chambers with a gas.

2. The web guide system of claim 1, further comprising a sealing device for sealing the two plies together along the first longitudinal edge after inflation of the chambers so as to seal the chambers closed.

3. The web guide system of claim 1, wherein said zone of reduced tension at the first longitudinal edge extends a predetermined distance downstream of the tension-reducing device and then tension increases in the first longitudinal edge, and further comprising a sealing device for sealing the two plies together along the first longitudinal edge, the sealing device being located downstream of said zone.

4. A web guide system for moving and guiding a continuous web along a path of conveyance, the web having a width defined along a transverse direction between opposite first and second longitudinal edges of the web, the web guide system comprising:

a web drive system structured and arranged to pull the web and advance the web along the path of conveyance;

a tension-reducing device located upstream of the web drive system and positioned to contact a surface of the web and to cause the web to partially wrap about an outer surface of the tension-reducing device, the tension-reducing device being configured to focus tension produced in the web by the web drive system upon the tension-reducing device at a location spaced in the transverse direction from the first longitudinal edge of the web, wherein the tension-reducing device comprises an elongate member extending generally transversely from the first longitudinal edge of the web toward the second longitudinal edge, the web guide system being structured and arranged to cause the web to partially wrap about the outer surface of the elongate member for an angle θ, the outer surface defining a maximum arc distance over said angle θ at said location, and the outer surface being configured such that everywhere between the first longitudinal edge of the web and said location an arc distance over said angle θ is smaller than said maximum arc distance, wherein the elongate member has a fixed end proximate the first longitudinal edge of the web and an opposite free end, and the elongate member has a length between the fixed end and the free end that is less than the width of the web;

the web drive system being operable to pull the web around the tension-reducing device such that tension in the web is non-uniform across the width of the web and reaches a maximum tension generally at said location and decreases toward the first longitudinal edge of the web to create a zone in the web at the first longitudinal edge having a lower degree of tension relative to the tension in the web at said location; and a web edge guide positioned to engage the web in said zone and to control transverse positioning of the first longitudinal edge.

5. The web guide system of claim 1, wherein the elongate member includes a first tapered portion that increases in arc distance along the outer surface over said angle θ from the first longitudinal edge to said location.

6. The web guide system of claim 5, wherein the elongate member includes a second tapered portion that decreases in arc distance along the outer surface over said angle θ from said location toward the second longitudinal edge of the web, such that the outer surface of the elongate member over said angle θ is generally crown-shaped.

7. The web guide system of claim 6, wherein the elongate member has a circular cross-sectional shape.

8. The web guide system of claim 1, wherein the elongate member is non-rotatable.

9. The web guide system of claim 1, wherein the elongate member is rotatable.

10. The web guide system of claim 1, further comprising a roll of the web rotatably mounted in a mounting arrangement, wherein the web comprises two overlying plies defining an opening between the plies along the first longitudinal edge.

11. The web guide system of claim 1, further comprising a roll of the web rotatably mounted in a mounting arrangement, and a tension regulation device operable to maintain tension in the web as the web is drawn from the roll.

* * * * *